Nov. 9, 1926.
L. J. HOUZE, SR
1,606,298
APPARATUS FOR MANUFACTURING GLASS
Filed Jan. 10, 1925
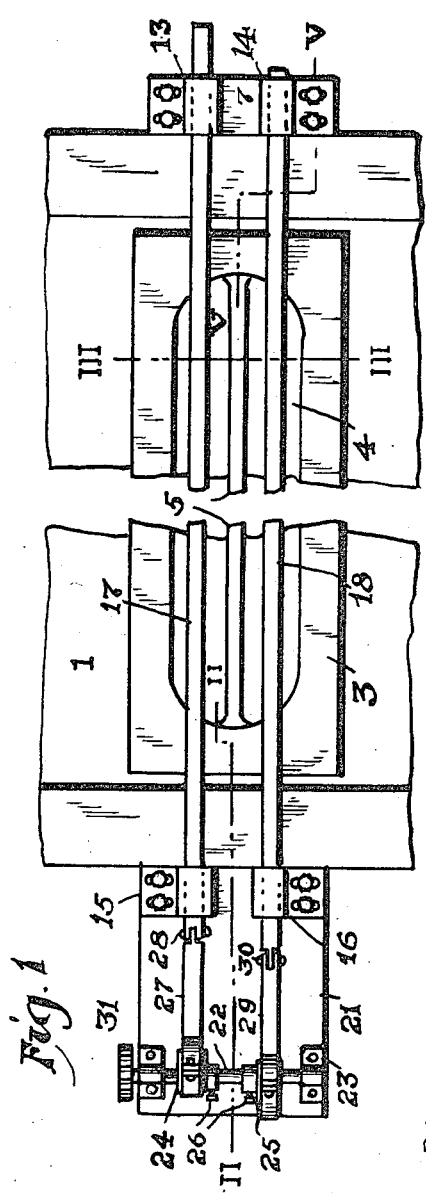
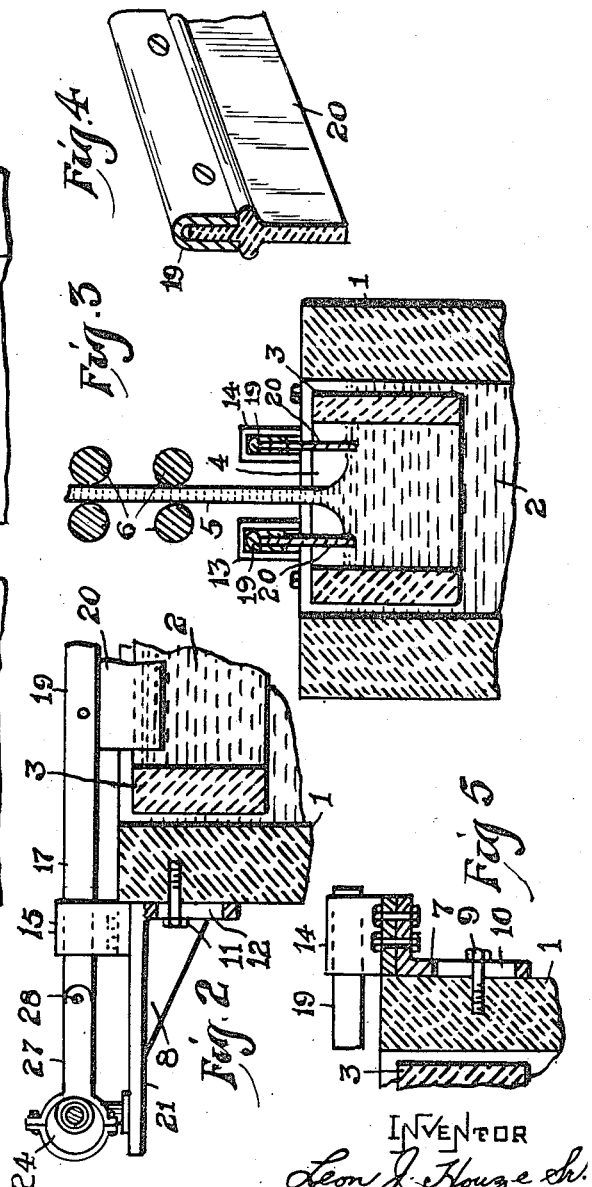

Patented Nov. 9, 1926.

1,606,298

UNITED STATES PATENT OFFICE.

LEON J. HOUZE, SR., OF POINT MARION, PENNSYLVANIA.

APPARATUS FOR MANUFACTURING GLASS.

Application filed January 10, 1925. Serial No. 1,592.

This invention relates to apparatus for manufacturing glass, more particularly for the manufacture of sheet glass by the mechanical process.

In the manufacture of drawn sheet glass by methods now commonly in use, the product invariably has discernible lines, detrimental to its transparent qualities and which are caused by inherent impurities of the glass and for other reasons not known in the art.

The primary object of this invention is to provide, in a manner as hereinafter set forth, a new and improved method and apparatus for producing drawn sheet glass entirely free of the usual lines, and which consists in drawing a glass sheet from a bath of molten glass while subjecting the latter to constant agitation, uniformly applied around the juncture of the glass sheet and the bath of molten glass during the drawing operation. Under such conditions providing for the production of a superior grade of mechanically drawn sheet glass entailing but slight additional manufacturing expense.

To the accomplishment of these and such other objects as may hereinafter appear, the invention consists of a new and improved method and apparatus for manufacturing drawn sheet glass, as hereinafter more specifically described and illustrated in the accompanying drawing, but it is to be understood that the apparatus shown in the drawing is merely illustrative of an embodiment by which the method can be carried out, therefore, various changes in the form, proportions and details of construction may be resorted to without departing from the principle or sacrificing any of the advantages of the invention which fall within the scope of the claims hereunto appended.

In the drawing wherein like numerals of reference designate corresponding parts throughout the several views:—

Figure 1 is a top plan view of an apparatus for carrying out the method in accordance with my invention.

Figure 2 is a sectional view on line II—II, Figure 1.

Figure 3 is a sectional view on line III—III, Figure 1.

Figure 4 is a fragmentary perspective view of an agitator member.

Figure 5 is a sectional view on line V—V, Figure 1.

Referring in detail to the drawing 1 denotes a tank in which the bath of molten glass 2 is contained. A floater 3, provided with a centrally disposed elongated slot or aperture 4, is partially submerged in the bath of molten glass 2, and the glass sheet 5 is mechanically drawn, in a vertical direction, from the bath of molten glass 2, through the floater aperture 4 and through the shaping rolls 6, as clearly illustrated in Figure 3 of the drawing.

The functions of the tank 1, floater 3, and shaping rolls 6, are well known in the art to which the invention appertains, and their construction, and arrangement conform to such structures now commonly in use and may be varied in details of construction to best meet conditions found in practice.

A supporting bracket 7 is attached at one side of the tank 1, and a supporting bracket 8 is attached at the opposite side of the tank structure 1. The bracket 7 is capable of vertical adjustment by the engagement of the bolt 9 in the elongated slot 10 formed in the bracket 7, and the bracket 8 is likewise capable of vertical adjustment by the engagement of the bolt 11 in the elongated slot 12 formed in the bracket 8.

A pair of spaced laterally adjustable guide blocks 13 and 14 are mounted on the supporting bracket 7 and a similarly arranged pair of guide blocks 15 and 16 are mounted on the supporting bracket 8.

An agitator 17 extends horizontally across the tank 1 and has its end portions slidably mounted for reciprocal movement in the respective guide blocks 13 and 15, and an agitator 18, likewise disposed, has its end portions slidably mounted for reciprocal movement in the respective guide blocks 14 and 16.

Each of the agitators 17 and 18 consists of a carrier 19 which is substantially channelshaped in transverse cross section and overlaps and carries the contact bar 20 which latter is detachably mounted therein.

The agitators 17 and 18 are disposed parallel relatively to each other and are so positioned that the contact bars 20 thereof extend into the floater aperture 4 and engage the surface of the molten glass 4 within the floater aperture 4 as clearly illustrated in Figure 3, of the drawing. As the lower, marginal edges of the contact bars 20 are constantly immersed and operate in the molten glass 2 they are subjected to the erosive action of such contacting engagement and must necessarily be constructed from suitable refractory material to best withstand such conditions. The vertical adjustment of the supporting brackets 7 and 8 will permit compensating regulation for such erosive action to the contact bars 20. The latter may also be replaced in their entirety in the carrier 19 when required.

The supporting bracket 8 is formed with a table 21 upon which a shaft 22 is journaled for rotation in the bearings 23. A pair of cams 24 and 25 are mounted on the shaft 22, and each may be fixed to the adjusted position by means of a set screw 26. A connecting rod 27, operating on the cam 24, is pivotally connected as at 28, to the end of the agitator 17 and a connecting rod 29, operating on the cam 25, is pivotally connected as at 30, to the end of the agitator 18.

The cams 24 and 25 are oppositely disposed with respect to each other on the shaft 22 and their operation will impart a reciprocal movement to the respective agitators 17 and 18. The arrangement of the cams 24 and 25 on the shaft 22 will cause the travel of the agitator 17 in one direction while the agitator 18 will travel in the other direction. The end of the shaft 22 is provided with a fixed gear 31 through which suitable motive power is transmitted for the operation of the agitators.

In the operation of the device the agitators 17 and 18 reciprocate slowly and the lower marginal edges of the contact bars 20 extend but a small distance into the bath of molten glass. The glass sheet 5 is drawn from the latter intermediate of the agitators 17 and 18 and therefore the agitation of the molten glass is confined in close proximity to the juncture of the glass sheet 5 with the molten glass 2, and along a distance commensurate to the width of the glass sheet and on both sides of the latter.

The vertical adjustment of the supporting brackets 7 and 8, and of the respective guide blocks 13, 14, 15 and 16 mounted thereon will permit of the proper adjustment of the agitators 17 and 18 relatively to their extension into the molten glass and to their position with the glass sheet 5.

Extensive experiments have proven that by subjecting the molten glass to agitation, at its juncture, with the glass sheet, being drawn therefrom, the formation of lines on the sheet glass will be entirely eliminated, thereby providing a product vastly superior to drawn sheet glass manufactured by methods now in use.

The specific manner of providing the requisite agitation to the molten glass, for the purpose stated, is not important, and any apparatus capable of agitating the molten glass, even the reciprocal shifting movement of the tank and bath of molten glass therein, in its entirety, would accomplish the elimination of the lines as stated. The device shown is merely illustrative of what is now thought to be the best embodiment thereof, and it is to be understood that any variations thereof may be resorted to which come within the scope of the claims hereunto appended.

What I claim is:

1. An apparatus for the purpose set forth comprising a pair of spaced horizontally disposed agitators adapted to extend into a bath of molten glass, supporting elements for said pair of agitators, said pair of agitators being arranged parallel with respect to each other and shiftably mounted in said supporting elements, and means operable for imparting a reciprocal movement to said pair of agitators for agitating said bath of molten glass.

2. An apparatus for the purpose set forth comprising a pair of spaced horizontally disposed agitators adapted to extend into a bath of molten glass, supporting elements for said pair of agitators, said pair of agitators being arranged parallel with respect to each other and shiftably mounted in said supporting elements, means operable for imparting a reciprocal movement to said pair of agitators for agitating said bath of molten glass, said pair of agitators capable of lateral and vertical adjustment to regulate their engagement with said bath of molten glass.

3. An apparatus for the purpose set forth comprising a pair of spaced horizontally disposed agitators adapted to extend into a bath of molten glass, supporting elements for said pair of agitators, said pair of agitators being arranged parallel with respect to each other and shiftably mounted in said supporting elements, means operable for imparting a reciprocal movement to said pair of agitators for agitating said bath of molten glass, the travel of one of said pair of agitators being in a direction opposite relatively to the travel of the other of said pair of agitators.

4. An apparatus for the purpose set forth comprising a pair of spaced horizontally disposed agitators adapted to extend into a bath of molten glass, supporting elements for said pair of agitators, said pair of agitators being arranged parallel with respect to each other and shiftably mounted in said supporting elements, means operable for imparting a reciprocal movement to said pair of agitators for agitating said bath of molten glass, the travel of one of said pair of agitators being in a direction opposite relatively to the travel of the other of said pair of agitators, said pair of agitators capable of lateral and vertical adjustment to regulate their engagement with said bath of molten glass.

In testimony whereof I affix my signature.

LEON J. HOUZE, Sr.